US012753806B2

(12) United States Patent
Dial et al.

(10) Patent No.: US 12,753,806 B2
(45) Date of Patent: Oct. 6, 2026

(54) SOLENOID STABILIZERS AND METHODS FOR STABILIZING SOLENOIDS IN VALVE BODIES

(71) Applicant: Sonnax Transmission Company, Bellows Falls, VT (US)

(72) Inventors: James A. Dial, Springfield, MO (US); Andrew M. Deyo, Keene, NH (US)

(73) Assignee: Sonnax Transmission Company, Bellows Falls, VT (US)

( * ) Notice: Subject to any disclaimer, the term of this patent is extended or adjusted under 35 U.S.C. 154(b) by 0 days.

(21) Appl. No.: 18/917,749

(22) Filed: Oct. 16, 2024

(65) Prior Publication Data

US 2025/0043832 A1 Feb. 6, 2025

Related U.S. Application Data

(62) Division of application No. 18/090,266, filed on Dec. 28, 2022, now Pat. No. 12,188,525.

(60) Provisional application No. 63/309,712, filed on Feb. 14, 2022.

(51) Int. Cl.

| | |
|---|---|
| ***F16K 27/02*** | (2006.01) |
| ***F16D 25/12*** | (2006.01) |
| ***F16K 31/06*** | (2006.01) |
| *F16D 125/58* | (2012.01) |

(52) U.S. Cl.

CPC .......... *F16D 25/126* (2013.01); *F16K 27/029* (2013.01); *F16K 31/0675* (2013.01); *F16D 2125/58* (2013.01); *F16D 2300/12* (2013.01)

(58) Field of Classification Search

None

See application file for complete search history.

(56) References Cited

U.S. PATENT DOCUMENTS

| | | | |
|---|---|---|---|
| 2,616,452 | A | 11/1952 | Clay |
| 3,123,880 | A | 3/1964 | Barry |
| 3,693,125 | A | 9/1972 | Prouty |
| 3,727,160 | A | 4/1973 | Churchill |
| 3,815,716 | A | 6/1974 | Harrington |
| 3,970,977 | A | 7/1976 | Weissberger |
| 4,153,959 | A | 5/1979 | Omley |
| 4,683,453 | A | 7/1987 | Vollmer |
| 4,923,350 | A | 5/1990 | Hinksman |
| 5,944,056 | A | 8/1999 | Miyazoe |
| 6,289,858 | B1 | 9/2001 | Altdorf |
| 6,305,870 | B1 | 10/2001 | Mita |
| 6,554,020 | B2 | 4/2003 | Yamaji |

(Continued)

*Primary Examiner* — Matthew W Jellett

(74) *Attorney, Agent, or Firm* — Andrus Intellectual Property Law, LLP

(57) ABSTRACT

A spring retainer configured to secure a solenoid in a transmission fluid valve body having bores. The solenoid is positioned in the valve body with a neck located at a slot. The spring retainer includes a body having an inverted U-shape with corresponding front and rear walls, the front and rear walls having a top and legs, the legs defining free ends opposite the top, the front and rear walls joined to one another at their respective free ends, at a bend, to space the front and rear walls from one another, the rear wall having a return bend at the top, the return bend extending downward to prevent collapse of the spring retainer when the spring retainer is installed to secure the solenoid in the transmission fluid valve body.

16 Claims, 6 Drawing Sheets

(56) References Cited

U.S. PATENT DOCUMENTS

| | | | | |
|---|---|---|---|---|
| 6,908,119 | B2 | 6/2005 | Murken | |
| 6,985,060 | B2 | 1/2006 | Parker | |
| 7,316,244 | B2 * | 1/2008 | Miyazoe | F15B 13/0875 137/271 |
| 7,611,317 | B2 | 11/2009 | Muderlak | |
| 7,621,690 | B2 | 11/2009 | Anderson | |
| 7,726,333 | B2 | 6/2010 | Hoshi | |
| 8,322,367 | B2 | 12/2012 | Harris | |
| 8,336,573 | B2 | 12/2012 | Ellis | |
| 8,511,337 | B2 * | 8/2013 | Nishimura | F16K 31/0655 251/129.08 |
| 8,753,139 | B2 | 6/2014 | Moosmann | |
| 9,062,791 | B2 | 6/2015 | Nakamura | |
| 9,951,852 | B2 | 4/2018 | Caldwell | |
| 10,408,339 | B2 | 9/2019 | Saxon | |
| 11,519,497 | B2 | 12/2022 | Dick | |
| 11,867,287 | B2 | 1/2024 | Saxon | |
| 2019/0178370 | A1 | 6/2019 | Dick | |

* cited by examiner

SOLENOID STABILIZERS AND METHODS FOR STABILIZING SOLENOIDS IN VALVE BODIES

CROSS-REFERENCE TO RELATED APPLICATION DATA

This application is a divisional application of U.S. patent application Ser. No. 18/090,266, filed Dec. 28, 2022, which claims the benefit of and priority to U.S. Provisional Patent Application No. 63/309,712, filed Feb. 14, 2022, both of which are incorporated by reference herein in their entireties.

BACKGROUND

The following description relates generally to a solenoid stabilizer for stabilizing solenoids in valve bodies and methods for stabilizing solenoids or linear motors in valve bodies.

Solenoids are used in vehicle automatic transmission and torque converter hydraulic systems to control the flow of hydraulic fluid throughout the transmission and/or torque converter. For example, solenoids are used to control the flow of transmission fluid for clutch apply pressure. Some types of solenoids are held or secured in place in the hydraulic fluid valve body by spring retainers. In certain transmissions the solenoid has a reciprocating element or pintle pin that is in direct contact with a control/regulating valve. One known arrangement is illustrated in FIGS. 1A-1C which show the retainer 1 on a solenoid 2 (FIG. 1A), a solenoid mounted in a portion of the valve body 3 with a portion of the valve body broken away for ease of understanding (FIG. 1B), and solenoids on a portion of the valve body showing a loose solenoid on the left (FIG. 1C). FIG. 1D illustrates a series of solenoids, spring retainers and control/regulating valves 4 laid out and positioned relative to a valve body.

The solenoid includes a body 5, a shoulder 6 and a head 7 with a neck 8 between the shoulder and head. The head, neck, shoulder and body are stationary members. The shoulder and head have a larger diameter than that of the neck. A movable (reciprocating) pintle 9 is positioned in the solenoid and extends out of the head. The pintle moves by actuation of (current applied to) the solenoid. The pintle reciprocates, acting on the movable valve stem.

The solenoid is positioned in the valve body. In a current arrangement, referring to FIG. 1C, the head and shoulder of the solenoid are positioned in bores 10 in the body, and the neck is located at a slot 11 in the body. The slot permits access to the solenoid neck. As best seen in FIG. 1A, a spring retainer 1 is inserted into the slot and on the solenoid neck to secure the solenoid in place in the valve body. Upper and lower portions 12, 13 of the retainer rest on a side 14 of the slot wall and exert a force (the spring force) on the head to urge a contact surface 15 of the head against an opposing wall 16 of the slot.

Known spring retainers have a generally inverted U-shaped body 17 with front and rear walls 18, 19. The top 20 of the "U" connects depending legs 21, 22 that define the front and rear walls. The front and rear walls are connected to each other at the free ends 23 of the legs by bends 24 that space the front and rear walls from each other. The bends are less than 180 degrees and define a partial slope indicated at 25 in the front wall.

The retainers are formed from spring steel, as such, the bends provide a spring-like action or spring function between the front and rear walls of the retainer. The rear wall includes a lip or return bend 26 toward and upwardly, toward the front wall. The front wall of the retainer rests on and applies a force on the solenoid head, and the rear wall of the retainer rests on the valve body slot wall to maintain the solenoid in place.

The solenoids are relatively heavy. Over time, as the solenoid is actuated and the pintle acts against the valve stem, the spring retainer loses its spring-like properties and may collapse. Consequently, the solenoids tend to push out of the bore in the valve body when the pintle pushes on the valve stem. This can also result in the retainer collapsing and the solenoid becoming loose (see FIG. 1C, left-hand solenoid). This can allow the solenoid to be off center with the valve and the solenoid to wobble in the bore.

As noted above, the solenoids, which are linear motors do not push fluid; rather, they move the inboard control or regulating valve by action of the pintle, which typically moves only a very small distance forward (about 0.090 inches). Any wobble or variance in the solenoid affects the inboard valve operation in that the solenoid pintle can no longer properly control the valve (valve shaft). Since the solenoids control clutch control and regulating valves, the downstream effect is on the clutch that the solenoid (via transmission fluid) is applying. As such, the negative effects are shift related, and degradation of the clutch or burned clutches.

In addition, the face of the solenoid head tends to mushroom the bore **10*a*** at the outboard end of the control/regulating valve. The compounded problems with spring retainer collapse and mushrooming of the outboard end of the control valve bore can further cause the valve to be out of position when the solenoid is energized which can cause flared shifts, delayed clutch engagements, multiple upshift and downshift complaints and numerous gear ratio error codes.

Accordingly, there is a need for a stabilizing mounting for solenoids in a valve casing. Desirably, such a stabilizer can be installed with minimal or no additional tools or processes, and with no or minimal modification to the valve casing.

SUMMARY

In one aspect a stabilizer is used with a spring retainer that secures a solenoid in a transmission fluid valve body. The valve body has a pair of collinear bores that are collinear with a movable valve stem, and a slot in the valve body between the bores.

A solenoid used with the valve body has a body, a shoulder, a head, and a neck between the head and the shoulder. The solenoid is positioned in the valve body with the neck located at the slot.

The spring retainer has a U-shaped body with corresponding front and rear walls. Each the front and rear wall has a top and a pair of depending legs. The legs define free ends opposite the top. The front and rear walls are joined to one another at their respective legs' free ends, at a bend, to space the front and rear walls from one another. The spring retainer is positioned on the solenoid neck in the slot, such that the front wall of the spring retainer rests on and applies a force on the solenoid head, and a portion of the rear wall of the spring retainer rests on a rear wall of the valve body slot.

The stabilizer prevents collapse of the spring retainer and attendant damage to the valve body and improper transmission and/or torque converter operation. In one aspect, the stabilizer has an inverted U-shaped body corresponding to the inverted U-shaped body of the spring retainer. The stabilizer has a top and a pair of depending legs that define free ends opposite the top. The stabilizer is configured for positioning in the spring retainer between the front and rear walls.

In embodiments, the stabilizer free ends are tapered. The taper can be from a front of the legs to a rear of the legs. The is formed from a relatively stiff but somewhat compressible material. One suitable material is low carbon steel.

The inverted U-shaped body can be a square inverted U-shaped body that coincides with a retainer square inverted U-shaped body.

In another aspect, in combination, a spring retainer and stabilizer secure a solenoid in a transmission fluid valve body. Such as valve body has a pair of collinear bores that are collinear with a movable valve stem. The body has a slot therein between the bores.

The solenoid has a body, a shoulder, a head, and a neck between the head and the shoulder. The solenoid is positioned in the valve body with the neck located at the slot.

The combination includes the spring retainer having an inverted U-shaped body with a top and depending legs. The depending legs have free ends opposite the top and the top has an outwardly extending lip The stabilizer has an inverted U-shaped body corresponding to the inverted U-shaped body of the spring retainer. The stabilizer has a top and a pair of depending legs that define free ends opposite the top portion. The stabilizer is configured for positioning abutting the spring retainer with the stabilizer top positioned on the outwardly extending lip.

The spring retainer and stabilizer are positioned on the solenoid neck in the slot, such that the stabilizer rests on and applies a force on the solenoid head, and a rear surface of the spring retainer rests on a rear wall of the valve body slot.

In embodiments, the spring retainer legs and/or top have raised or indented portions such that the legs are non-planar. The raised or indented portions provide a preload to maintain the retainer and stabilizer in the valve body.

In embodiments, the stabilizer legs are tapered. The taper can be a side-to-side taper.

The stabilizer is formed from a relatively stiff but somewhat compressible material. One suitable material is low carbon steel.

In still another aspect, a spring retainer secures a solenoid in a transmission fluid valve body. The valve body has a pair of bores therein collinear with one another and collinear with a movable valve stem, and a slot in the valve body between the bores. The solenoid has a body, a shoulder, a head, and a neck between the head and the shoulder, The solenoid is positioned in the valve body with the neck located at the slot.

The spring retainer includes a body having an inverted U-shape with corresponding front and rear walls. Each the front and rear walls has a top and a pair of depending legs. The legs define free ends opposite the top. The front and rear walls are joined to one another at their respective free ends, at a bend, to space the front and rear walls from one another.

The rear wall has a return bend at the top. The return bend extends downward, such that upon rearward bending of the front wall, the front wall contacts the return bend to prevent collapse of the spring retainer.

In embodiments, the return bend is about a 180 degree bend. The spring retainer can further include a lip at an end of the return bend. The lip is inwardly bent toward the rear wall.

In yet another aspect, a stabilizer secures a plurality of solenoids in a transmission fluid valve body. Such a valve body has a plurality of pairs of bores therein, the bores of each pair of bores define an axis and are collinear with one another and collinear with a movable valve stem.

The stabilizer includes a bracket having a main body extending across the valve body transverse to the axes defined by the pairs of bores. The bracket can be mounted to the body by fasteners extending through the valve body, which fasteners are not aligned with any of the axes.

A plurality of arms extend from the main body generally aligned with each axis. A tab depends from a rear of each arm and a pair of clamping fingers extend from each arm to encircle a portion of respective solenoids. The clamping fingers extend from each arm between the tab and the main body. The tabs can have an inward bends to apply a preload to the solenoids.

In still another aspect, a method of stabilizing a solenoid in a transmission fluid valve body is described. Such a method is used with a valve having a valve body having a pair of bores therein collinear with one another and collinear with a movable valve stem, and a slot in the valve body between the bores. A solenoid has a body, a shoulder, a head, and a neck between the head and the shoulder, the solenoid positioned in the valve body with the neck located at the slot.

The method includes positioning a stabilizer in a spring retainer, which spring retainer has a U-shaped body with corresponding front and rear walls, each the front and rear walls having a top and a pair of depending legs, the legs defining free ends opposite the top, the front and rear walls joined to one another at their respective free ends, at a bend, to space the front and rear walls from one another, and the stabilizer having a U-shaped body corresponding to the U-shaped body of the spring retainer and having a top and a pair of depending legs, the legs defining free ends opposite the top, the stabilizer being positioned in the spring retainer between the front and rear walls.

The method further includes inserting the spring retainer and the stabilizer on the solenoid neck in the slot, such that the front wall of the spring retainer rests on and applies a force on the solenoid head, and a portion of the rear wall of the spring retainer rests on a rear wall of the valve body slot.

In methods, the spring retainer includes a return bend forward and upwardly, toward the front wall, and the stabilizer is positioned in the spring retainer resting on the return bend.

Other objects, features, and advantages of the disclosure will be apparent from the following description, taken in conjunction with the accompanying sheets of drawings, wherein like numerals refer to like parts, elements, components, steps, and processes.

BRIEF DESCRIPTION OF THE DRAWINGS

in FIG. 3B, the retainer and stabilizer are shown in a front perspective view; in FIG.

Figure 1A:
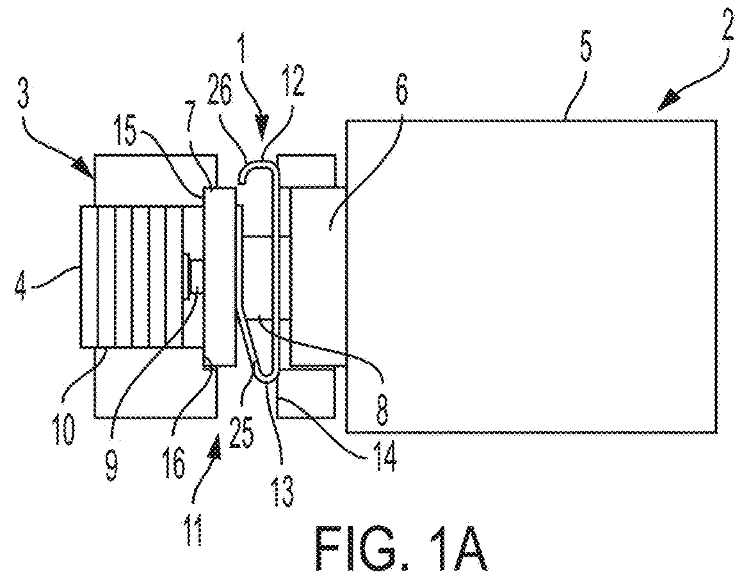
FIG. 1A PRIOR ART
FIGS. 1A-1D are illustrations of a known retainer clip on a solenoid (FIG. 1A), a solenoid mounted in a portion of the valve body with a portion of the valve body broken away for ease of understanding (FIG. 1B), solenoids on a portion of the valve body showing a loose solenoid in the solenoid on the left (FIG. 1C), and a series of solenoids, spring retainers and control/regulating valves laid out and positioned relative to a valve casing.
Figure 1B:
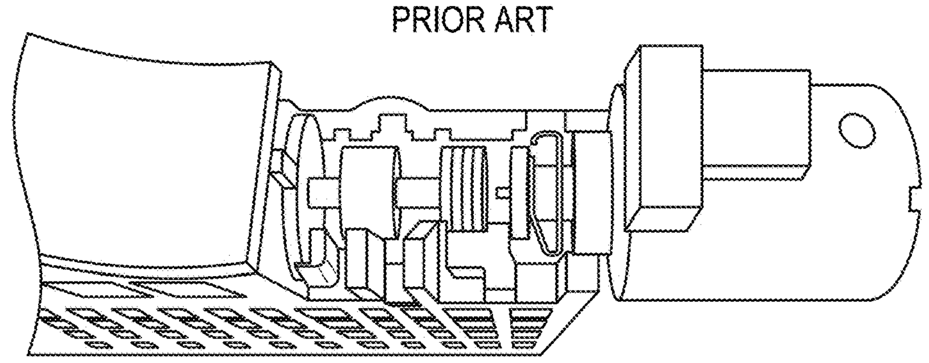
FIG. 1B PRIOR ART
Figure 1C:
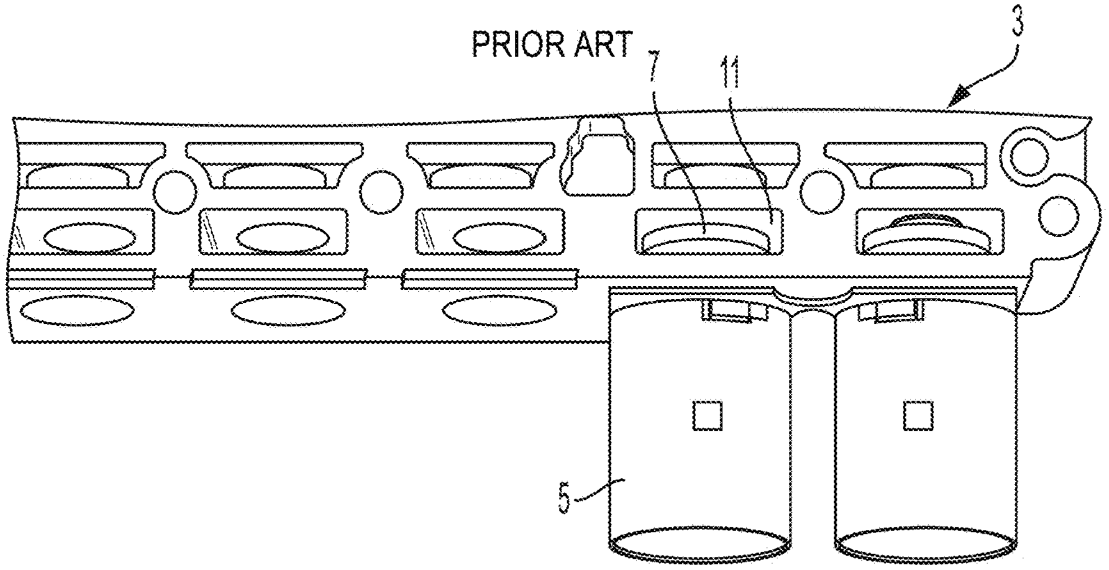
FIG. 1C PRIOR ART
Figure 1D:
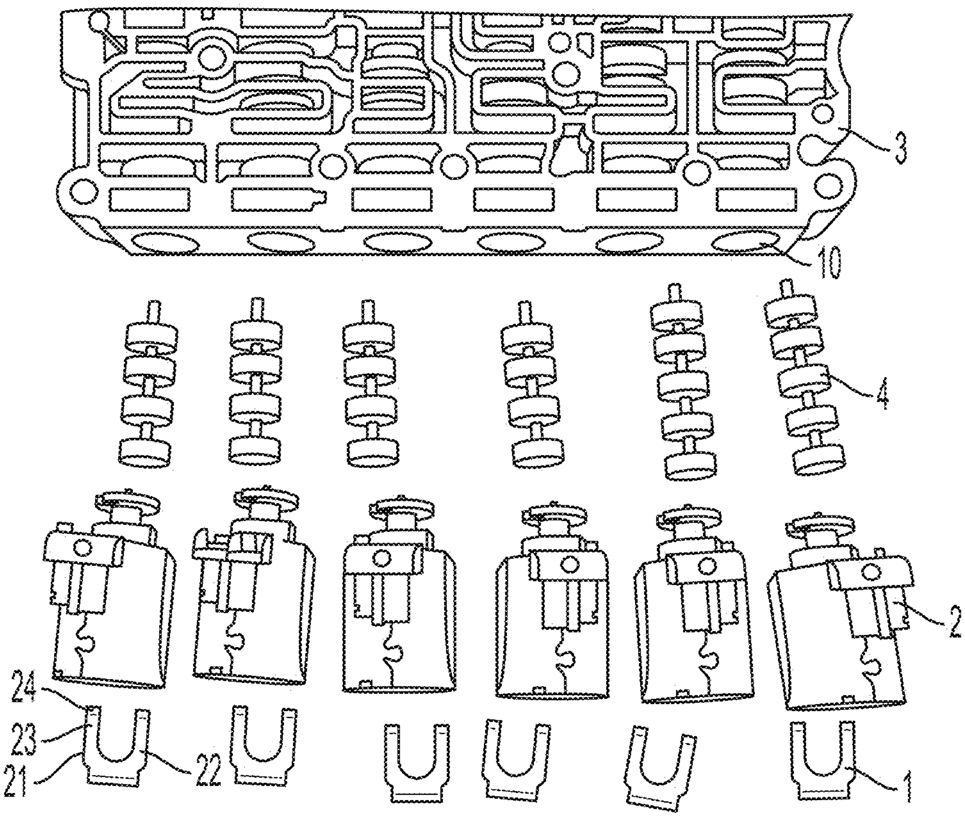
Figure 2:
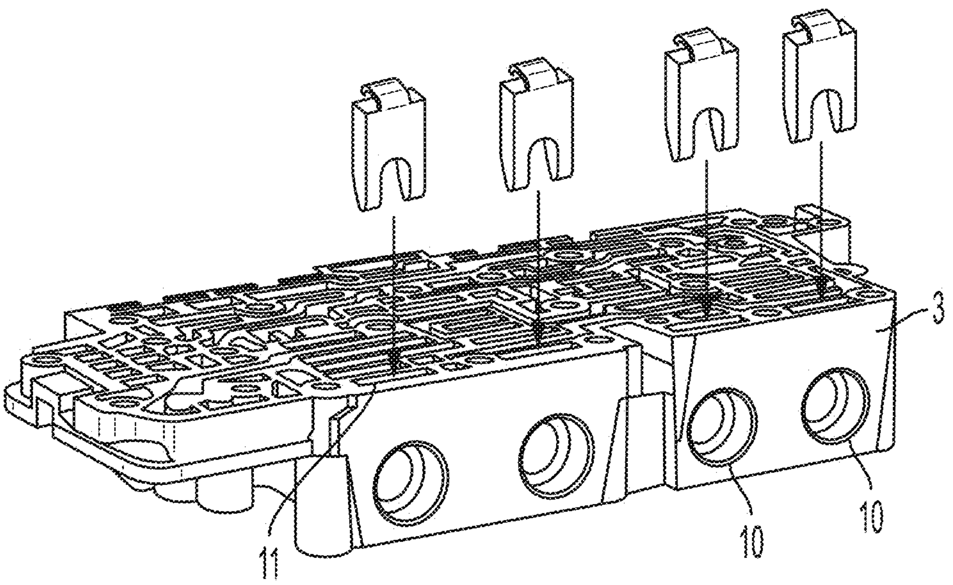
FIG. 2 illustrates a series of spring retainers and stabilizers as they install in the valve body.
Figure 3A:
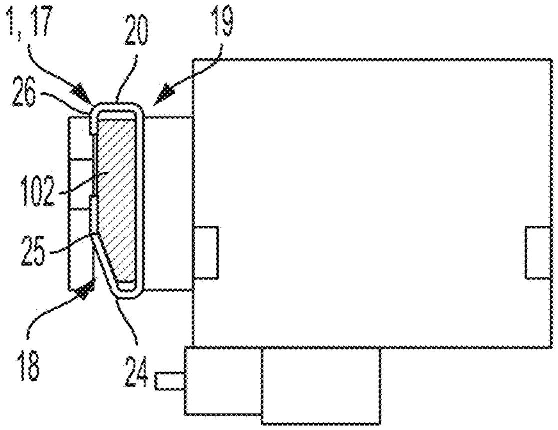
FIGS. 3A-3D are illustrations of the spring retainer with the stabilizer in place, in which in FIG. 3A the retainer and stabilizer are shown in a solenoid.
Figure 3B:
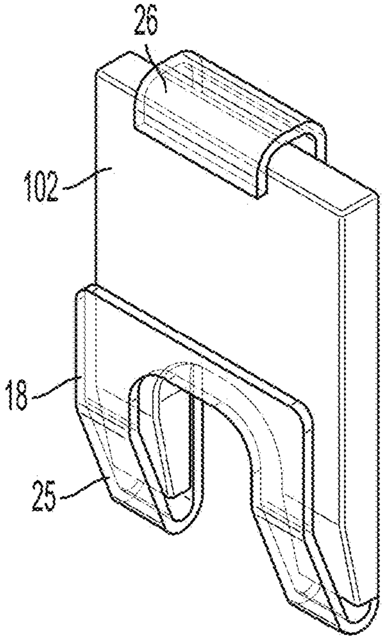
Figure 3C:
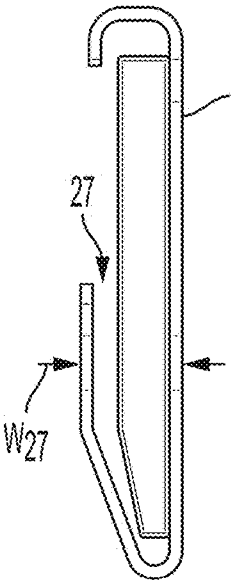
Figure 3D:
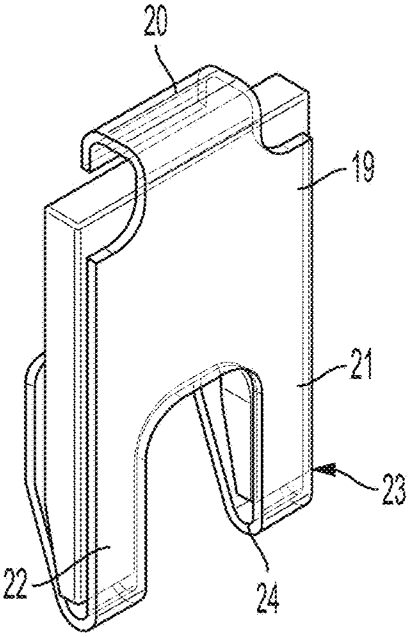

3C, the retainer and stabilizer are shown in a side view and in FIG. 3D, the retainer and stabilizer are shown in a rear perspective view.

Figure 4A:
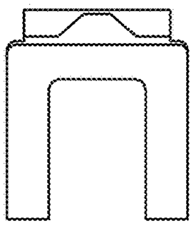
Figure 4B:
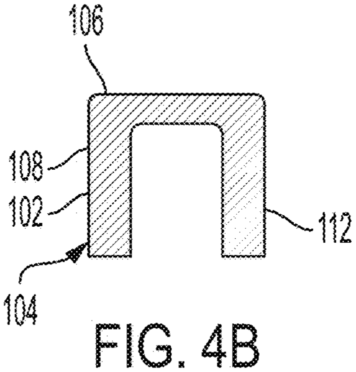
Figure 4C:
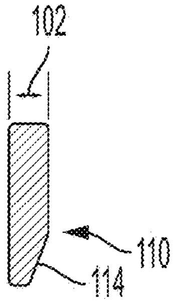
Figure 4D:
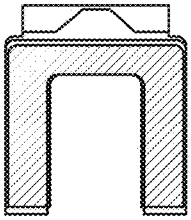
Figure 5A:
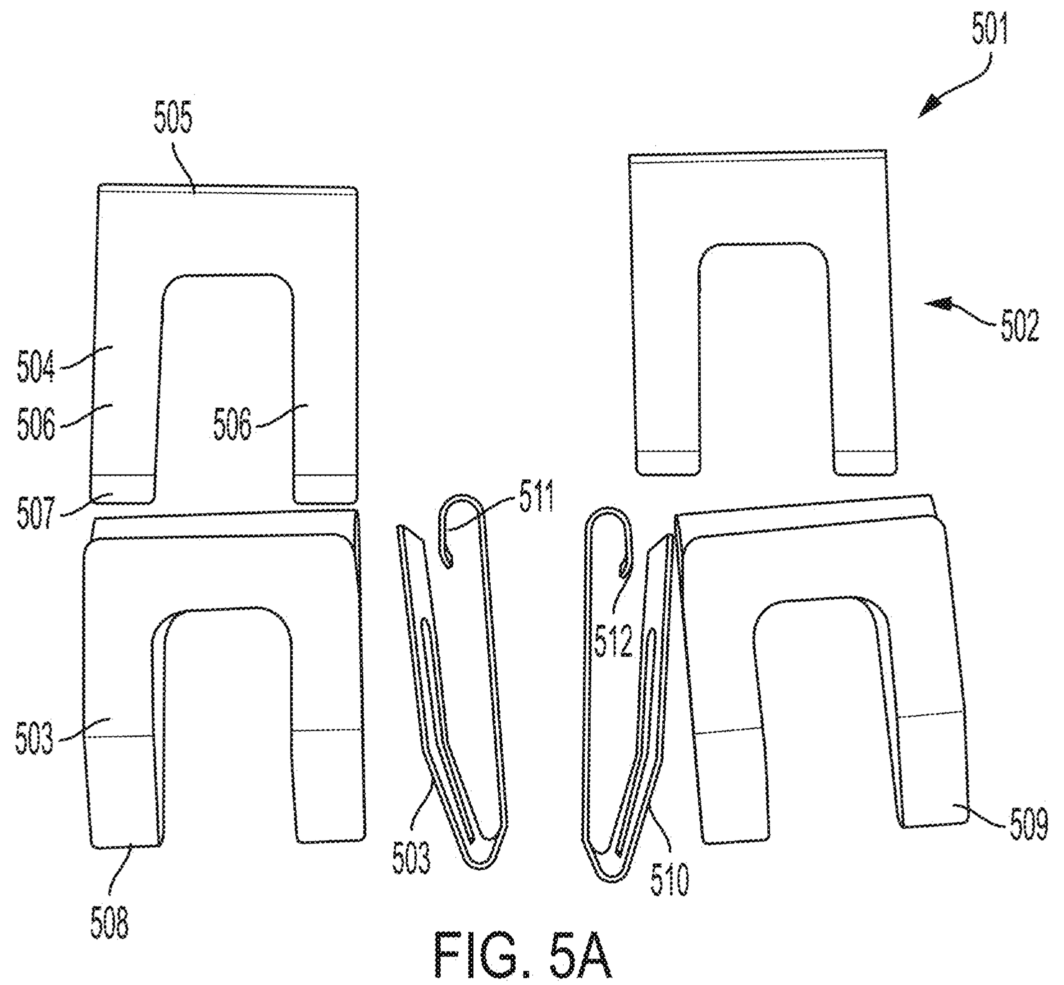
Figure 5B:
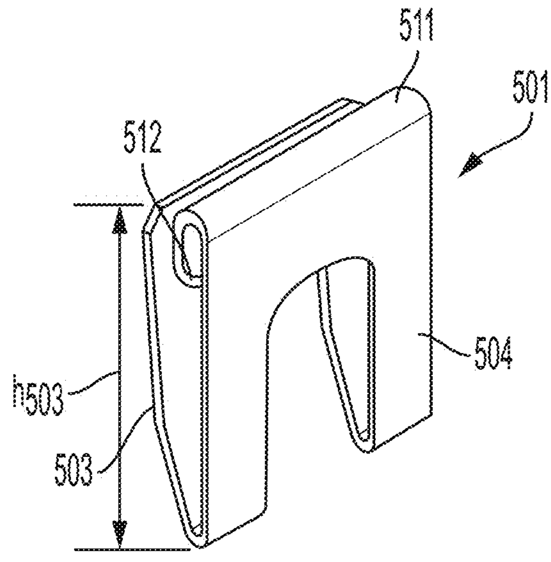
Figure 6A:
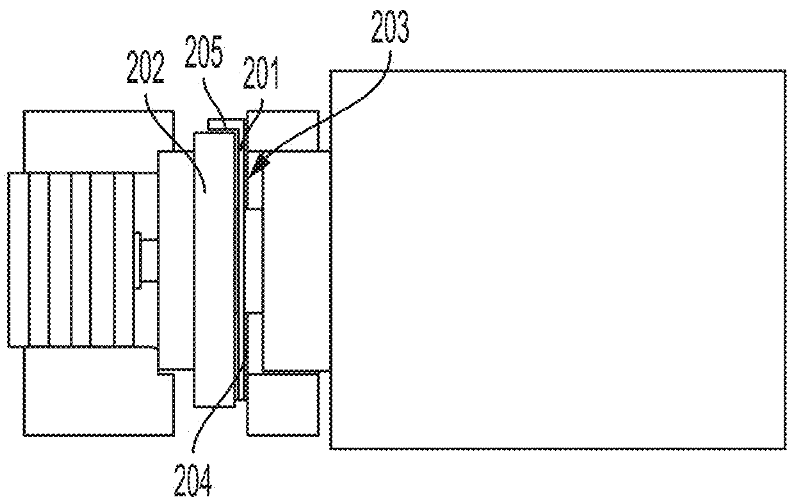
Figure 6B:
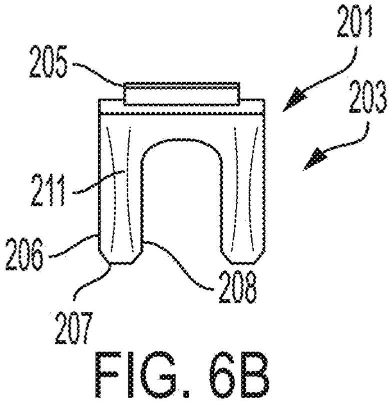
Figure 6C:
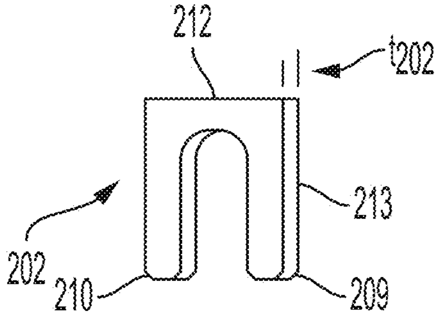
Figure 7:
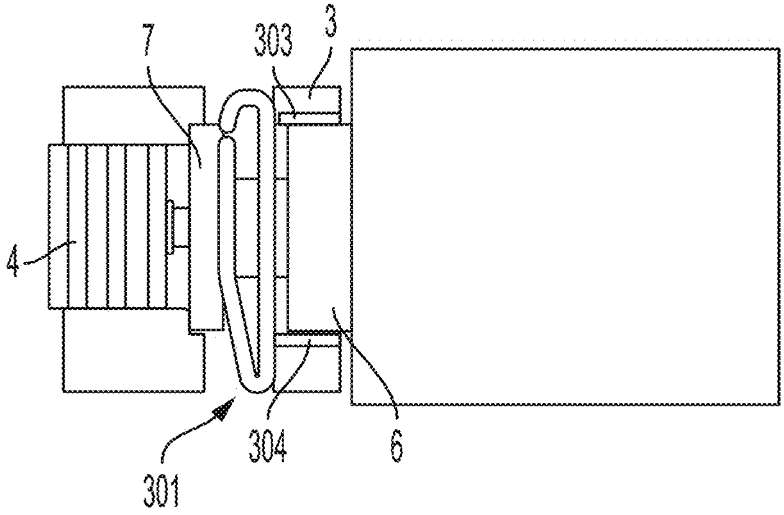
Figure 8A:
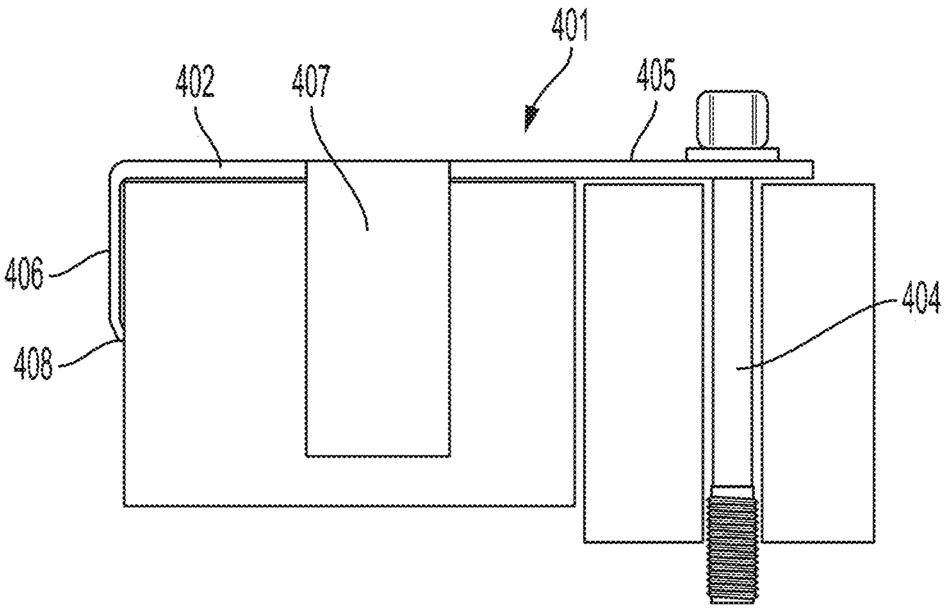
Figure 8B:
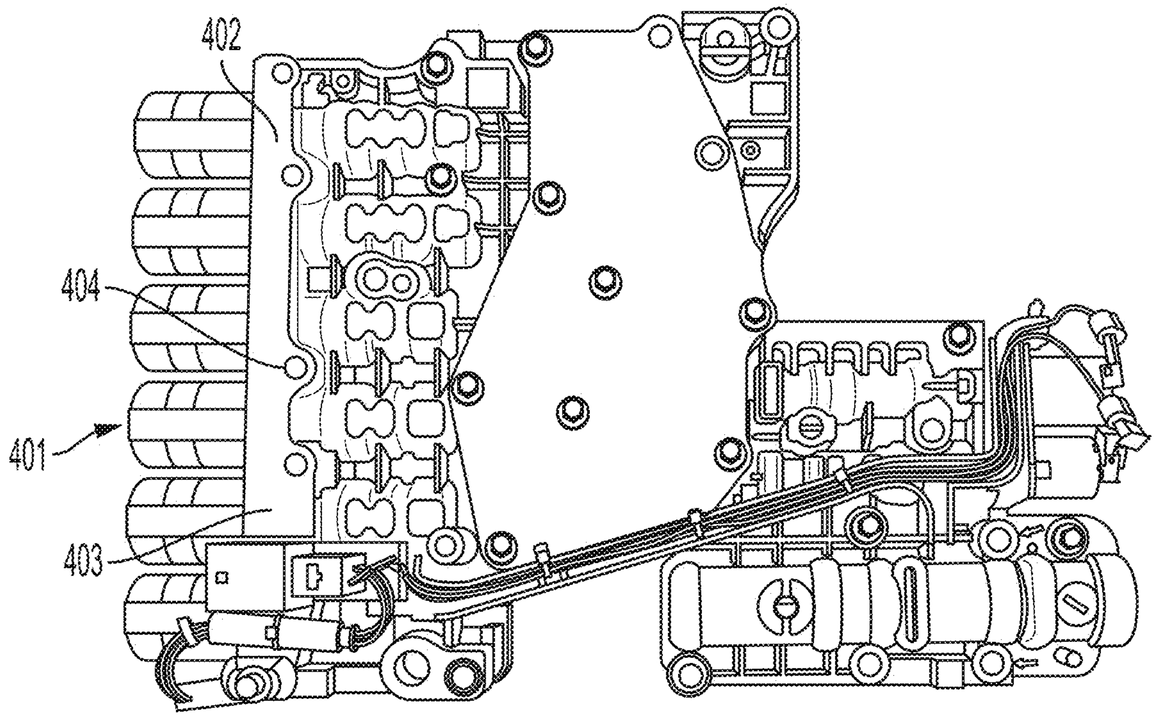

FIGS. 4A-4D are vrous views of the retainer (FIG. 4A0, the stabilizer (FIGS. 4B and 4C) and the spring retainer and stabilizer (FIG. 4D);

FIGS. 5A and 5B are front, side and perspective views of an embodiment of an enhanced spring retainer that can be used without a stabilizer;

FIGS. 6A-6C illustrate a solenoid with an embodiment of a solenoid stabilizer in which FIG. 4A illustrates the solenoid and solenoid stabilizer in place, FIG. 4B illustrates an L-shaped spring retainer and FIG. 4C illustrates a stabilizer spacer;

FIG. 7 illustrates an embodiment of a stabilizer in which the valve casing (casting) is reamed and a sleeve is installed in the reamed region of the casing and a more robust spring retainer is used to secure the solenoid in the casing; and FIGS. 8A and 8B illustrate yet another embodiment of a stabilizer in which a support bracket is mounted to the valve casing to stabilize the solenoid in place in the valve casing in which FIG. 8A illustrates one bracket, and FIG. 8B illustrates a series of brackets mounted to a valve casing.

DETAILED DESCRIPTION

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

In embodiments herein, stabilizers are disclosed for stabilizing a solenoid 2 or linear motor that operates on a valve 4 in a fluid circuit body 5 in a vehicle automatic transmission. The solenoids 2 act on valves 4 that permit, isolate or regulate the flow of transmission fluid throughout the fluid circuit to control, for example, clutch apply. Referring to FIGS. 1A-1D, the solenoid 2 includes a body 5, a shoulder 6, and a head 7, with a neck 8 between the head and shoulder. The head, shoulder, neck and body are stationary members. The movable (reciprocating) pintle 9 is positioned in the solenoid 2 and extends out of the head 7. The pintle 9 moves by actuation of (current applied to) the solenoid. The pintle acts on the movable valve stem 4.

Referring now to FIGS. 2, 3A-3D and 4A and B, a spring retainer 1 and an embodiment of a spring retainer stabilizer 102 are shown. The spring retainer 1 includes a generally upside down or inverted U-shaped body 17 with front and rear walls 18, 19. The inverted U-shape can be a squared inverted "U." The top 20 of the "U" connects depending legs 21, 22. The front and rear walls are connected to each other at the free ends 23 of the legs 21, 22 by bends 24 that space the front and rear walls 18, 19 from each other. The bends 24 are less than 180 degrees and define a partial slope, indicated at 25, in the front wall 18.

The retainers 1 are formed from spring steel, as such, the bends 24 provide a spring-like action or spring function between the front and rear walls 18, 19 of the retainer 1. The rear wall 19 includes a lip or return bend 26 rearwardly and downwardly, toward the front wall 18. The retainer front wall 18 rests on and applies a force on the solenoid head 7, and the retainer rear wall 19 rests on the valve body slot wall 16 to maintain the solenoid 1 in place.

In an embodiment, the stabilizer 102 includes an inverted U-shaped body 104 similar to the shape of the spring retainer 1. The stabilizer 102 has a top 106 and a pair of opposing depending legs 108. In an embodiment, the body 102 is a square inverted U-shaped body. The top 106 and the depending legs 108 are configured for positioning in the retainer 1 in the space between the retainer front and rear walls 18, 19. The retainer 1, with the stabilizer 102 positioned in the space between the front and rear walls 18, 19, is positioned or inserted in the valve body slot 11, over the solenoid neck 8. The stabilizer 102 prevents collapse of the spring retainer 1 as the solenoid 2 cycles through actuation and de-actuation cycles.

As seen in FIGS. 3A-D and 4C, the stabilizer 102 has a thickness $t_{102}$ about equal to the width $w_{27}$ of the space 27 between the retainer front and rear walls 18, 19. The stabilizer legs 108 have a profile about the same as the profile of the retainer legs 21, 22 such that the stabilizer 102 fits well within the retainer 1.

In an embodiment, a lower portion 110 of the stabilizer legs 108 at about the free ends 112, has tapered or angle surfaces (as indicated at 114), tapered front to rear, (on both legs) that permit readily positioning the stabilizer 102 in the retainer 1. The tapered surfaces 114 are positioned at about the bend 24, at the sloped surfaces 25 in the retainer 1 so that the retainer 1 retains its spring function, but is prevented from collapsing if or when the spring-like properties of the retainer 1 begin to lessen or are lost. The retainer sloped surfaces 25 also permit readily inserting the retainer 1 and stabilizer 102 into the slot 11, onto the solenoid neck 8.

In a current embodiment, the stabilizer 102 is formed from a stiff but somewhat compressible material such as low carbon steel. Other suitable materials will be recognized by those skilled in the art. The stabilizer 102 prevents or significantly retards compression of the spring retainer 1, which prevents the head 7 from being off center and from mushrooming the bore 10*a* of the valve body 3 on the outboard end of the control/regulating valve 4.

An alternate embodiment of a retainer 201 and stabilizer 202 is shown in FIGS. 6A-6C. In this embodiment, the retainer 201 includes a body 203 having an inverted U-shape, such as the illustrated squared inverted U-shape, but has only a wall 204 and an upper outwardly extending lip 205. The stabilizer 202 again, is formed from a stiff but somewhat compressible material such as low carbon steel, and has a shape similar to the shape of the retainer 201, which as illustrated can be a square inverted U-shape. The retainer legs 206 can have a side-to-side taper as indicated at 207 at about their lower end 208. The stabilizer 202 has a top 212, and can have a constant thickness $t_{202}$ and can include side-to-side tapers 209 at the leg 213 free ends 210, that can coincide with side-to-side tapers 207 on the retainer legs 206. The retainer lip 205 is positioned to maintain the stabilizer 202 in place on the retainer 201. The retainer 201 can include raised or indented portions 211 such that the body 203 and/or legs 206 are not planar. The raised or indented portions 211 provide prevent bending and provide a preload or slight spring function to help the retainer 201 and stabilizer 202 maintain proper placement in the valve body slot 11 and prevent movement of the solenoid 2 when in operation.

Still another embodiment of a retainer 301 is shown in FIG. 7. In this embodiment, the retainer 301 has a shape that is similar to that of, for example, the embodiment of FIG. 1, but is more robust; that is, the retainer 301 is larger (extending farther upward and downward into the valve body slot 11) and is formed from a thicker material. It is recognized that the retainer 301 may still lose its spring characteristics over time. As such, the valve body 3 may be reamed out (as indicated at 303) and a sleeve 304 inserted into the reamed area 303 of the valve body 3. The sleeve 304 is dimensioned to reduce the tolerances between the solenoid shoulder 6 and the valve body 3. The more robust retainer 301 and reduced tolerance sleeve 304 reduce the opportunity for the head 7 to be off center and for the head 7 mushrooming the bore 10*a* of the valve body 3 on the outboard end of the control/regulating valve 4.

Yet another embodiment of a stabilizer 401 is illustrated in FIGS. 8A and 8B. In this embodiment, a bracket 402 supports multiple solenoids 2 mounted on the valve body 3. The bracket 402 includes a main body portion 403 that extends along the valve body 3 and is fastened to the valve body 3. The fasteners 404 can be, for example, bolts that extend through the valve body 3 between and/or outside of the solenoid 2 locations. An arm 405 extends from the body 403 at each solenoid 2 location that runs longitudinally along the solenoid 2. A tab 406 depends from the arm 405 at the rear of the solenoid 2 to secure the end of the solenoid 2 and a pair of clamping fingers 407 extend from the arm 405 to encircle a portion of solenoid 2 body between the tab 406 and the main body portion 403. The tab 406 can have a slight inward bend as at 408 to apply a preload to the solenoid 2 to maintain it held securely in the valve body 3.

Still another embodiment of a spring retainer 501 to secure a solenoid in a transmission fluid valve body is illustrated in FIGS. 5A and 5B. The spring retainer 501 has an inverted U-shaped body 502 with corresponding front and rear walls 503, 504. The front and rear walls 503, 504 each have a top 505 and a pair of depending legs 506. The legs 503, 504 define free ends 507 opposite their respective tops 505.

The front and rear walls 503, 504 are joined to one another at their respective free ends 507, at bends 508, to space the front and rear walls 503, 504 from one another. One of the front and rear walls (as illustrated, the front wall 503) includes an upwardly and outwardly angled portion 509 from its respective free end 507 and a bend 510 beyond the angled portion 509 such that the reminder of the wall 503 is generally parallel to the other wall (as illustrated the remainder of the front wall 503 is parallel to the rear wall 504).

The rear wall 504 includes a return bend 511 and can include an inwardly oriented lip 512 at the end of the return bend 511. The return bend 511 can be formed about 180 degrees relative to the rear wall 504. In embodiments, the inwardly oriented lip 512 can extend so far as to contact the rear wall 504. And, in embodiments, the height $h_{503}$ of the front wall 503 is such that when bent toward the rear wall 504, the front wall 503 contacts the rear wall return bend 511. In such embodiments, the retainer 501 can be formed from a thicker material. It is envisioned that such a retainer 501 will not require a stabilizer, in that contact of the front wall 503 with the return bend 511 will prevent collapse of the retainer. Nevertheless, the configuration of the retainer 501 will allow for use of a stabilizer.

As installed in the valve body 3, the spring retainer 501 is positioned on the solenoid neck 8 in the slot 11, such that the front wall 503 of the spring retainer 501 rests on and applies a force on the solenoid head 7, and a portion of the rear wall 503 of the spring retainer 501 rests on a rear wall 14 of the valve body slot 11. When compressed, the front wall 503 can be forced rearward to the rear wall 504 and, again, collapse of the retainer 501 is prevented by the front wall 503 contacting the rear wall return bend 511.

A method of stabilizing a solenoid 2 in a transmission fluid valve body 3 in which the valve body has a pair of bores 10 therein collinear with one another and collinear with a movable valve stem 4, and a slot 11 in the valve body 3 between the bores 10, and a solenoid 2 has a body 5, a shoulder 6, a head 7, and a neck 8 between the head 7 and the shoulder 6, the solenoid 2 positioned in the valve body 3 with the neck 8 located at the slot 11, which method includes positioning a stabilizer 102 in a spring retainer 1, which spring retainer 1 has an inverted U-shaped body 17 with corresponding front and rear walls 18, 19, each the front and rear walls 18, 19 having a top 20 and a pair of depending legs 21, 22, the legs 21, 22 defining free ends 23 opposite the top 20, the front and rear walls 18, 19 joined to one another at their respective free ends 23 of their legs 21, 22, at a bend 24, to space the front and rear walls 18, 19 from one another, and the stabilizer 102 having an inverted U-shaped body 104 corresponding to the inverted U-shaped body 17 of the spring retainer 1 and having a top 106 and a pair of depending legs 108, the legs 108 defining free ends 112 opposite the top 106, the stabilizer 102 being positioned in the spring retainer 1 between the front and rear walls 18, 19.

The method further includes inserting the spring retainer 1 and the stabilizer 102 on the solenoid neck 8 in the slot 11, such that the spring retainer front wall 18 rests on and applies a force on the solenoid head 7, and a portion of the spring retainer rear wall 19 rests on a rear wall 16 of the valve body slot 11. In methods, the spring retainer 1 includes a return bend 26 forward and upwardly, toward the front wall 18, and the stabilizer 102 is positioned in the spring retainer 1 resting on the return bend 26.

It is understood that the features described with respect to any of the embodiments above may be implemented, used together with, or replace features described in any of the other embodiments above. It is also understood that description of some features may be omitted in some embodiments, where similar or identical features are discussed in other embodiments.

All patents referred to herein, are hereby incorporated herein in their entirety, by reference, whether or not specifically indicated as such within the text of this disclosure.

In the present disclosure, the words “a” or “an” are to be taken to include both the singular and the plural. Conversely, any reference to plural items shall, where appropriate, include the singular. In addition, in is understood that terminology referring to directions or relative orientations, such as, but not limited to, “upper” “lower” “raised” “lowered” “top” “bottom” “above” “below” “alongside” “left” and “right” are used for purposes of example and do not limit the scope of the subject matter described herein to such orientations or relative positioning.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A spring retainer configured to secure a solenoid in a transmission fluid valve body, the valve body having bores therein collinear with one another and collinear with a movable valve stem, and a slot in the valve body between the bores, the solenoid having a solenoid body, a shoulder, a head, and a neck between the head and the shoulder, the solenoid positioned in the valve body with the neck located at the slot, the spring retainer comprising:

a spring retainer body having an inverted U-shape with corresponding front and rear walls, each of the front and rear walls having a top and legs, the legs defining free ends opposite the top, the front and rear walls joined to one another, at a bend, to space the front and rear walls from one another, the rear wall having a return bend at the top that extends downward to prevent collapse of the front wall via interference therewith when the spring retainer is installed to secure the solenoid in the transmission fluid valve body.

2. The spring retainer of claim 1, wherein the return bend is about a 180 degree bend.

3. The spring retainer of claim 1, further including a lip at an end of the return bend.

4. The spring retainer of claim 3, wherein the lip is inwardly bent toward the rear wall.

5. The spring retainer of claim 1, wherein the spring retainer body is configured such that upon rearward bending of the front wall, the front wall contacts the return bend to prevent collapse of the spring retainer when the spring retainer is installed to secure the solenoid in the transmission fluid valve body.

6. The spring retainer of claim 1, wherein the legs each comprise an angled portion that angles inwardly from the front wall to the rear wall thereof.

7. A system comprising the spring retainer of claim 1, further comprising a stabilizer configured for positioning in the spring retainer between the front and rear walls thereof to assist in spacing the front and rear walls from one another.

8. A spring retainer configured to secure a solenoid in a transmission fluid valve body, the valve body having bores therein collinear with one another and collinear with a movable valve stem, and a slot in the valve body between the bores, the solenoid having a solenoid body, a shoulder, a head, and a neck between the head and the shoulder, the solenoid positioned in the valve body with the neck located at the slot, the spring retainer comprising:

a spring retainer body having an inverted U-shape with corresponding front and rear walls, each of the front and rear walls having a top and legs, the legs defining free ends opposite the top, the front and rear walls joined to one another at their respective free ends, at a bend, to space the front and rear walls from one another, the rear wall having a return bend at the top, the return bend extending downward to prevent collapse of the spring retainer when the spring retainer is installed to secure the solenoid in the transmission fluid valve body; and a stabilizer configured for positioning in the spring retainer between the front and rear walls thereof to assist in spacing the front and rear walls from one another, wherein the stabilizer comprises an inverted U-shaped stabilizer body corresponding to the inverted U-shaped spring retainer body of the spring retainer and having a top and a pair of depending, the legs defining free ends opposite the top.

9. A method to stabilize a solenoid in a transmission fluid valve body, the valve body having bores therein collinear with one another and collinear with a movable valve stem, and a slot in the valve body between the bores, the solenoid having solenoid body, a shoulder, a head, and a neck between the head and the shoulder, the solenoid positioned in the valve body with the neck located at the slot, the method comprising:

inserting a spring retainer on the solenoid neck in the slot, such that a front wall of the spring retainer rests on and applies a force on the solenoid head, and a portion of a rear wall of the spring retainer rests on a rear wall of the valve body slot, wherein the rear wall has a return bend that extends downward to prevent collapse of the front wall via interference therewith when the spring retainer is installed to secure the solenoid in the transmission fluid valve body.

10. The method of claim 9, wherein the return bend is about a 180 degree bend.

11. The method of claim 9, further including a lip at an end of the return bend.

12. The method of claim 11, wherein the lip is inwardly bent toward the rear wall.

13. The method of claim 9, wherein the spring retainer is configured such that upon rearward bending of the front wall, the front wall contacts the return bend to prevent collapse of the spring retainer.

14. The method of claim 9, wherein the spring retainer comprises a spring retainer body having an inverted U-shape.

15. The method of claim 9, further comprising positioning a stabilizer between the front and rear walls of the spring retainer before inserting the spring retainer on the solenoid neck in the slot, whereby the stabilizer assists in spacing the front and rear walls from one another.

16. A method to stabilize a solenoid in a transmission fluid valve body, the valve body having bores therein collinear with one another and collinear with a movable valve stem, and a slot in the valve body between the bores, the solenoid having solenoid body, a shoulder, a head, and a neck between the head and the shoulder, the solenoid positioned in the valve body with the neck located at the slot, the method comprising:

inserting a spring retainer on the solenoid neck in the slot, such that a front wall of the spring retainer rests on and applies a force on the solenoid head, and a portion of a rear wall of the spring retainer rests on a rear wall of the valve body slot, wherein the rear wall has a return bend that extends downward to prevent collapse of the spring retainer when the spring retainer is installed to secure the solenoid in the transmission fluid valve body; and positioning a stabilizer between the front and rear walls of the spring retainer before inserting the spring retainer on the solenoid neck in the slot, whereby the stabilizer assists in spacing the front and rear walls from one another, wherein the spring retainer comprises a spring retainer body having an inverted U-shape and the stabilizer has an inverted U-shape corresponding thereto.

* * * * *